March 13, 1945.　　B. A. SWENNES　　2,371,574
AUTOMATIC TRANSMISSION
Filed April 23, 1941
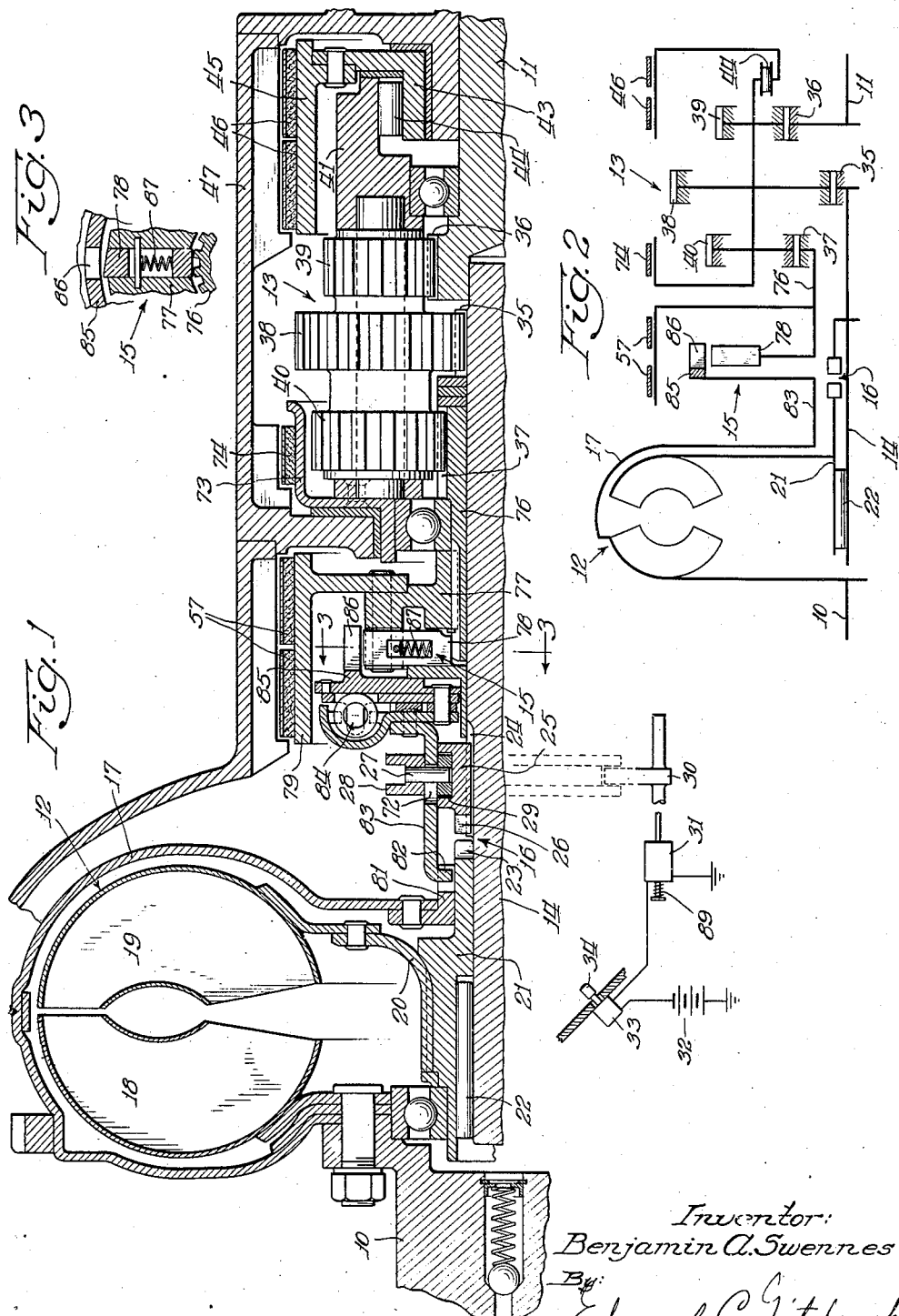

UNITED STATES PATENT OFFICE 2,371,574

AUTOMATIC TRANSMISSION

Benjamin A. Swennes, Rockford, Ill., assignor to Borg-Warner Corporation, Chicago, Ill., a corporation of Illinois Application April 23, 1941, Serial No. 389,850

4 Claims. (Cl. 74—189.5)

This invention relates to transmissions, and particularly to a transmission utilizing a fluid device combined with gearing.

The inherent smoothness and shock-absorbing characteristics of fluid devices such as hydraulic couplings of the Fottinger type makes these devices desirable for use in automobile transmissions. A hydraulic coupling, however, does not multiply torque, and accordingly, must be used with gearing in order to obtain the high torque ratios necessary to provide an automobile with a suitable amount of acceleration. This creates shifting problems, particularly where positive clutches are used, since a hydraulic coupling transmits torque as a function of the speed of the driving element thereof, and if the driving element is continuously rotated as it would be when directly connected with an automobile engine, a certain amount of torque is always transmitted to the positive clutch, thereby rendering shifting either difficult or impossible. This is particularly true where a positive clutch is used to effect a shift from neutral into either forward or reverse. When the shifting is to be done automatically in accordance with present trends, the problem becomes even more complex.

The objects of this invention is to provide an automatic transmission employing a fluid device combined with gearing, wherein under ordinary circumstances no shifting of positive toothed elements is required between neutral, forward and reverse, and which nevertheless does not require any complicated controls.

Another object of this invention is to provide a simple, inexpensive two-speed automatic transmission suitable for use in low-priced cars.

Another object of this invention is to provide a two-speed automatic transmission with an intermediate manually operated speed available for use in emergencies.

These and other objects and features of the invention will become apparent from the following description when taken together with the accompanying drawing, in which:

Fig. 1 is a fragmentary side elevation partly in section of one embodiment of the invention;

Fig. 2 is a schematic line drawing showing the principal torque transmitting elements of the transmission in Fig. 1;

Fig. 3 is a fragmentary section taken along line 3—3 of Fig. 1.

Referring now to the drawing, and particularly to Figs. 1 and 2, the transmission is comprised of a drive shaft 10, a driven shaft 11, a hydraulic coupling 12, planetary gearing 13, an overrunning clutch 22, an intermediate shaft 14 connecting the clutch 22 and gearing 13, an automatic clutch 15 for providing a different connection between gearing 13 and drive shaft 10, and a manually controlled clutch 16 for locking gearing 13 with coupling 12 around overrunning clutch 22. Secured to shaft 10 is a fly-wheel housing 17 which forms a container for hydraulic coupling 12. Said coupling 12 has an impeller member 18 likewise secured to drive shaft 10 and a runner 19 adapted to be driven by impeller 18 through the medium of oil or other fluid substantially filling housing 17. Runner 19 is mounted on a splined hub 20, which is splined to a sleeve 21. The forward end (to the left in Fig. 1) of sleeve 21 is enlarged to accommodate one-way clutch 22, which is of the roller-and-cam type, and which functions to permit intermediate shaft 14 to rotate faster than sleeve 21. The rearward end of sleeve 21 is provided with axially extending teeth 23 forming the driving element of clutch 16. Shaft 14 is provided with splines 24 on which is slidably mounted a collar 25 having formed at the forward end thereof teeth 26 which are adapted to engage teeth 23 of sleeve 21.

Clutch 16 is operated by means of a pin 27 in an axially slidable collar 28, said pin 27 riding in a groove 29 in collar 25. A yoke 30 cooperates with collar 28 to move said collar in an axial direction. Yoke 30 is controlled by means of a spring 89 and a solenoid 31, which in turn is supplied with electrical energy from a battery 32 or other source of electromotive force, through a switch 33 operated by a button 34. Said switch is of such a character that when button 34 is depressed and then released, a change is effected in the electrical circuit which obtains until said button 34 is again depressed and released. Spring 89 normally biases yoke 30 to the left (Fig. 1) to engage clutch 16.

Planetary gear set 13 is comprised of a sun gear 35 formed on the end of shaft 14, a sun gear 36 formed on the adjacent end of driven shaft 11, a third sun gear 37 formed on a sleeve 76, which surrounds shaft 14, and one or more sets of cluster gears 38, 39 and 40, meshing respectively with sun gears 35, 36, 37. Said cluster gears are mounted on a carrier 41 which is coaxial with shafts 14 and 11. Said carrier 41 is connected to a flanged hub 43 by means of a one-way clutch 44, which permits rotation between carrier 41 and hub 43 when carrier 41 tends to rotate ahead of hub 43. Flanged hub 43 is provided with a cylindrical brake drum 45, which cooperates with a double wrap brake band 46 to arrest the rotation of hub 43. Brake band 46 is suitably anchored by any well known means to a fixed casing 47 surrounding planetary gear set 13.

Thus when brake band 46 is applied, flanged hub 43 will be held against rotation, and if at the time the reaction in carrier 41 is in a reverse direction, said carrier will likewise be held against rotation by means of the one-way clutch 44, the latter under these circumstances acting as a one-way brake. If the reaction is in the opposite direction, the one-way brake releases and carrier 41 will rotate even though brake 46 is still applied. A second brake, operative in both directions, is also provided for carrier 41. This brake is comprised of a drum 73 rigidly secured to carrier 41 and a brake band 74 which is manually controlled, and which cooperates with drum 73 to arrest the latter. The function of this brake will be described hereinafter.

Clutch 15 is comprised of a carrier 77 in which are mounted one or more radially movable pawls 78. Carrier 77 also supports a brake drum 79, which cooperates with a double-wrap brake band 57. Housing 17 is attached to a toothed hub member 81, which is connected through interfitting teeth 82 to a cylindrical stamping 83 surrounding shaft 14. Said stamping 83 is connected through a vibration absorbing device 84 to a drum 85 having slots 86 in axial alignment with radially movable pawls 78. The pawls are normally held in retracted position by means of a biasing spring 87. A slot 72 in stamping 83 allows pin 27 to pass through the stamping to groove 29.

The operation of the transmission is as follows:

Assuming that the engine is rotating and that drive shaft 10 is, therefore, likewise rotating, housing 17, impeller 18 and clutch drum 86 will be rotated simultaneously with drive shaft 10, since they are all connected together. These elements, therefore, rotate whether the engine is developing driving torque or is merely idling. If it is desired to test or warm up the engine without transmitting any torque to driven shaft 11, brake bands 46, 57 and 74 are released to condition the transmission for neutral. Any driving torque transmitted through coupling 12 to sun gear 35 is thereby dissipated by the rotation of carrier 41 about sun gear 36 on driven shaft 11. Sun gear 37 and its associated carrier 77 and pawls 78 will likewise be rotated, but due to the planetating action of gear 40, the actual speed of sun gear 37 will not be sufficient to cause pawls 78 to move outwardly to engage the clutch.

Assuming that the driver wishes to put the car in motion in a forward direction, brake band 46 will be applied to arrest the rotation of hub 43. Since there is a load on driven shaft 11, the torque transmitted through coupling 12, overrunning clutch 22 and sun gear 35 will cause the carrier 41 to lean on one-way brake 44, which in turn reacts against hub 43 and brake band 46. The net result, therefore, is to arrest the rotation of carrier 41 so that it becomes a countershaft, and driven shaft 11 will be rotated at a reduced speed through sun gear 35, planet gears 38 and 39 and sun gear 36. This drive will be a 100 per cent fluid drive, that is to say, all the engine torque will be transmitted through coupling 12. Simultaneously with the rotation of planet gear 38, planet gear 40 will likewise be rotated, which in turn will drive sun gear 37 and its associated pawls 78 at an increasing speed as the car gains momentum. At some predetermined speed said pawls 78 will move radially outwardly to contact drum 85. At this time, drum 85 is rotating faster than pawls 78 and the latter, therefore, will not engage slots 86, but will ratchet over them. This will continue as long as drive shaft 10 is driven by the engine, that is, as long as torque is impressed upon drive shaft 10 which is greater than the load on driven shaft 11. Thus, this condition may obtain over a relatively large range of speeds, and direct drive may be delayed or accelerated at the will of the operator.

When the operator wishes to shift into direct drive, he simply releases the accelerator to decelerate the engine, whereupon drum 85 will proceed to slow down with respect to 77, and eventually will reach a point of synchronism therewith. If at this point a pawl is in line with a slot, engagement will occur, but if the two are not in alignment, the continued slowing down of drum 86 will cause a relative reversal in the direction of rotation of drum 85 with respect to pawl 78, so that when the next slot 86 drifts past pawl 78, the latter will engage the slot due to the shape of the end of the pawl. The resumption of the drive in drive shaft 10 will then provide a drive between shaft 10 and sun gear 37. Clutch 15 will remain engaged until the speed of sun gear 37 falls below a predetermined speed, whereupon the release of clutch 15 is automatically effected by springs 87.

Thus, sun gear 37 will be driven at engine speed, and sun gear 35 will tend to rotate at some speed greater than engine speed because of the difference in the size of planet gears 38 and 40. It will be assumed for the present that lock-out clutch 16 has been operated to by-pass overrunning clutch 22 and that the tendency to rotate gear 35 faster than the engine will be prevented by fluid coupling 12, which at these speeds is operating at substantially one-to-one ratio. With both sun gears rotating at approximately the same speed, the planetary gear set will be locked up and driven shaft 11 will rotate at substantially engine speed.

To obtain reverse, brake band 46 is released and brake band 57 is applied. The drive is again through coupling 12 and by-pass clutch 16 to sun gear 35, but sun gear 37 is locked to housing 47 through brake band 57. Due to the difference in size of sun gears 35 and 37, carrier 41 will be driven in a reverse direction with respect to sun gear 35, and will carry with it sun gear 36 and its associated driven shaft 11. This results in a reverse rotation of driven shaft 11 at a reduced speed.

It will be apparent thus far that the transmission just described can be operated as an automatic two-speed transmission. In some cases, however, two speeds are not sufficient, and it is desirable to provide an intermediate speed corresponding to second speed in the standard transmission. This is accomplished by the means now to be described.

It will be noted that when the transmission is operated as a two-speed transmission, jaw clutch 16 is engaged to make overrunning clutch 22 ineffective. This prevents sun gear 35 from rotating faster than drive shaft 10, and as a consequence, the planetary gear set is locked up in one-to-one drive when clutch 15 is engaged. To secure an intermediate second speed, it is necessary to release clutch 16 to permit sun gear 35 to rotate freely. Under these conditions the engagement of automatic clutch 15 transfers the drive from sun gear 35 to the smaller sun gear 37, the reaction in carrier 41 remaining in a reverse direction, and a higher speed ratio drive than results.

The release of clutch 16 to secure second speed drive is effected by depressing button 34 to break the circuit through solenoid 31. This causes spring 89 to disengage clutch 16 by suitably operating yoke 30 and slidable collar 28. Said collar 28 is, of course, rotated with sleeve 83 by reason of the pin 27 which passes through slot 72 in sleeve 83. Button 34 may be depressed while the transmission is in neutral to cause second speed to become effective immediately after the first speed, or it may be depressed while the transmission is in direct to provide a down shift. Assuming first that it has been depressed while the transmission is in neutral, clutch 16 is thereby released and sun gear 35 is driven initially from coupling 12 through overrunning clutch 22, the transmission having been previously conditioned for low speed by operating brake 46 to arrest carrier 41 through one-way brake 44 to cause it to act as a countershaft. Sun gear 37 is likewise rotated, and when the speed for which clutch 15 is set is reached, said clutch will engage so that the sun gear 37 is driven at engine speed. Due to the overrunning clutch 22, the resulting high speed rotation of sun gear 35 has no effect upon the drive, and planet gear 39 being smaller than planet gear 40, an intermediate speed ratio will be effected between drive shaft 10 and driven shaft 11. This drive is a purely mechanical drive and is independent of fluid coupling 12.

The transmission will remain in second speed until the driver again depresses foot button 34 to operate solenoid 31. This will cause yoke 30 and its associated elements to be biased to the left, that is, toward the engaged position of clutch 16. If, at this instant the clutch teeth 23 and 26 are in alignment, the clutch will engage immediately, thereby connecting runner 19 around overrunning clutch 22 to intermediate shaft 14 and sun gear 35. Sun gear 35 will then be rotated at substantially the same speed as sun gear 37 and the gear set will be conditioned for direct drive. If, however, clutch teeth 23 and 26 are not in alignment, but are butt-ended, the operator may release the accelerator so as to slow down the engine, and the momentum of the car will then drive sun gear 36 and planet gears 39, 38 and 40. Clutch 15 having previously been engaged will remain engaged, thereby causing sun gear 37 to rotate at the same speed as drive shaft 10. With the drive reversed, however, so that sun gear 36 is a driving member and sun gear 37 is the reaction member, sun gear 35 and intermediate shaft 14 will tend to rotate backwardly, but will be limited in their backward tendency by overrunning clutch 22, which will then cause these elements to rotate at the same speed as runner 19. At these speeds of the engine, the drive through coupling 12 will be substantially a direct drive, and the car will therefore coast in direct drive. This means that there will be no relative rotation between teeth 23 and 26, and the problem of synchronizing them prior to engagement is eliminated. Upon the next torque reversal, that is, when the accelerator is again depressed to cause drive shaft 10 to rotate faster than driven shaft 11, the reaction of the load on gear 36 will tend to again rotate gear 35 faster than runner 19, but due to the bias on teeth 26, this rotation will last for only a fraction of a tooth and will cease when clutch teeth 23 and 26 are aligned and become engaged. The resulting drive will then be a direct drive.

Assuming now that the transmission is in direct and that button 34 has been depressed to effect a down shift, a releasing bias will be impressed upon clutch 16. If this bias is greater than the torque load on the clutch, the latter will release and sun gear 35 will spin freely ahead of runner 19. Carrier 41 will then assume the resulting backward reaction and transfer it through one-way brake 44 to brake band 46. If, however, the bias is not sufficient, the engine may be slowed down, as for example by releasing the accelerator, to decrease the torque, and during the momentary torque reversal which ensues, the load on clutch 16 will be relieved sufficiently to permit teeth 26 to be disengaged. Upon a resumption of the drive, sun gear 35 will be freed because of overrunning clutch 22 and the transmission will be in second speed. The shift back to direct will be made as described above.

In direct drive, only a fraction of the torque is transmitted through the coupling, the remainder being transmitted through clutch 15, which is a mechanical drive. Thus, in low speed the drive is purely hydraulic, giving the operator the benefit of the smooth start which is inherent in a fluid drive, and in direct drive, the torque is divided so that the coupling transmits only a fraction of the total torque, which results in maximum efficiency at the speeds at which the transmission will be operated the greater portion of the time. In second speed the drive is a purely mechanical drive, which eliminates excessive slipping of the coupling under heavy load conditions, such as long inclines, and prevents undue heating of the coupling.

Where a long and steep downgrade is encountered so as to make desirable the use of the engine as a brake, the second brake mentioned is provided for carrier 41. This is necessary because one-way brake 44 will release under these conditions, and the transmission will be coasting in direct. It will be recalled that the second brake for carrier 41 is comprised of a drum 73 which is riveted directly to carrier 41 and a suitable brake band 74, which is adapted to cooperate with drum 73 to arrest the rotation thereof. When it is desired to coast in second against the engine, brake 74 is applied to arrest the rotation of carrier 41 and clutch 16 will be released to permit shaft 14 to overrun runner 19 through overrunning clutch 22. When power is again applied to drive driven shaft 11, the transmission will be in second speed, and will remain so conditioned until brake band 74 is released and clutch 16 is subsequently reengaged.

It will be noted that with the pawl type of clutch the diameter of the housing at the clutch is small, and the transmission as a whole is short and compact.

No controls are shown here for the various brake bands, it being assumed that suitable controls can be designed to meet the particular requirements of the manufacturer or user. It is contemplated, however, that the controls be manually operated so that the brakes may be applied whether or not the engine or car is in operation. With manually operated controls it is possible to apply brake 46 of Fig. 1 when the engine is not running, and thereby crank the engine by pushing the car. For this type of cranking, jaw clutch 16 must be operated so as to drive the runner of the coupling from driven shaft 11, and thereby drive the impeller and its associated crank shaft 10. This operation will be effected by means of spring 89 in Fig. 1.

It is understood that the foregoing description is merely illustrative of one embodiment of this invention and that the scope of the claims is not to be limited thereto, but is to be determined by the appended claims.

I claim:

1. A transmission comprising a drive shaft, a driven shaft, a gear on said driven shaft, an intermediate shaft, a gear on said intermediate shaft, a hydraulic coupling having an impeller connected to the drive shaft and a runner, a sleeve surrounding the intermediate shaft and connected to rotate with the runner, an overrunning clutch connecting the sleeve to the intermediate shaft in a manner permitting the shaft to rotate ahead of the sleeve, a positive clutch for connecting the sleeve and intermediate shaft for two-way drive around the overrunning clutch, a gear concentric with the intermediate shaft, a positive clutch comprising a slotted drum, a slotted cylindrical element connected to rotate with the drive shaft and transmitting the drive to the drum and a radially movable centrifugally controlled pawl in axial alignment with the slots in the drum; a sleeve connected to rotate with the concentric gear, a carrier for the pawl driven by the sleeve, an axially shiftable collar surrounding the cylindrical element, a connection between the collar and positive clutch to control the operation of the positive clutch, manually controlled means for shifting the collar, planet gears cooperating with each of the gears, a carrier for the planet gears, one-way brake means for arresting the rotation of the carrier for low speed drive, two-way brake means for driving the drive shaft from the driven shaft in a geared ratio, and two-way brake means associated with the concentric gear for reverse drive.

2. In a variable speed transmission, the combination of drive and driven shafts, planetary gearing including a pair of sun gears and planet gears in mesh with the sun gears, said driven shaft being connected with one of the elements of said gearing, a one-way brake for one of the elements of the planetary gearing and means for driving one of said sun gears from said drive shaft, said brake and said last named means cooperating to provide a low speed drive through the transmission, coupling means including a slotted rotatable element and a radially slidable pawl adapted to engage the slotted element, said coupling means being connected in series with said other sun gear and adapted to complete a higher speed ratio train through the transmission, and a one-way coupling device operative to establish said high speed ratio when the torque is reversed.

3. In a variable speed transmission, the combination of drive and driven shafts, planetary gearing including at least a pair of sun gears, a planet gear in mesh with each of the sun gears and a carrier for the planet gears, said driven shaft being connected with one of the elements of said gearing, a roller and cam type one-way brake for one of the elements of the planetary gearing and means for driving one of said sun gears from said drive shaft, said brake and said last named means cooperating to provide a low speed drive through the transmission and said brake being adapted to release upon a reversal of torque through the transmission, coupling means including a slotted rotatable element and a radially slidable pawl adapted to engage the slotted element, said coupling means being connected in series with the other sun gear and adapted to complete a higher speed ratio train through the transmission, and a one-way coupling device automatically operable upon a release of the one-way brake to establish said higher speed ratio when the torque is reversed.

4. A transmission comprising a drive shaft, a driven shaft, and change speed mechanism connectable between said shafts including means for driving the driven shaft at first, second and third speed ratios, said second speed means comprising a speed controlled positive clutch element rotatable in timed relation with the driven shaft and a cooperating clutch element associated with the drive shaft, said speed controlled element being dependent upon substantial synchronization with the cooperating element before effecting engagement therewith, said speed controlled clutch element comprising a radially movable pawl, and said cooperating clutch element comprising a drum having slots in axial alignment with the pawl.

BENJAMIN A. SWENNES.